P. HLEB.
NUT LOCK.
APPLICATION FILED MAY 31, 1919.
1,404,290.
Patented Jan. 24, 1922.
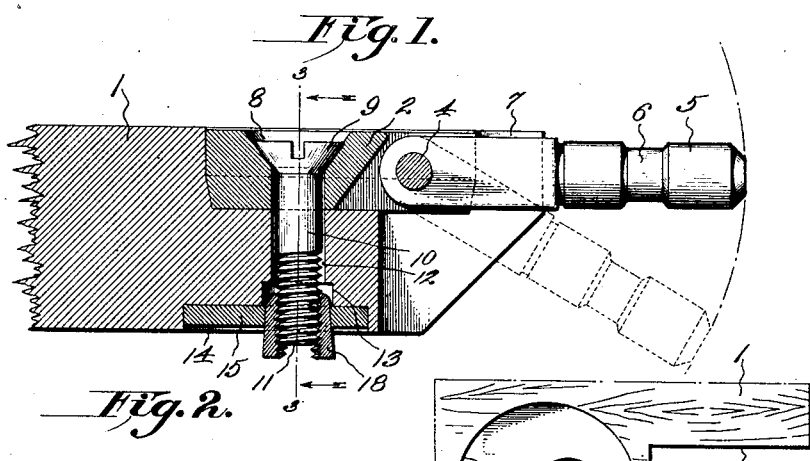
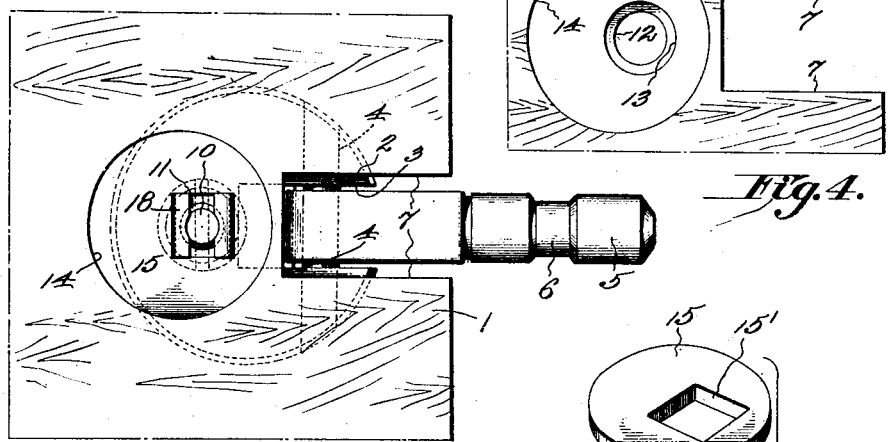
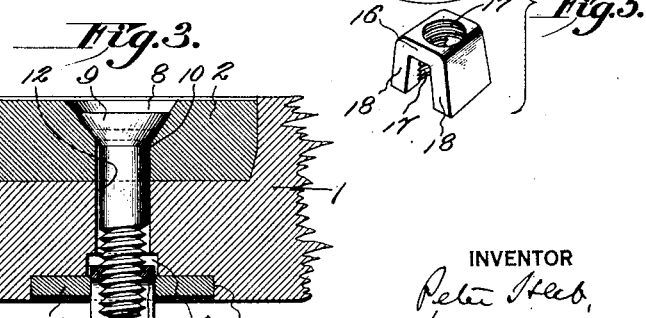
WITNESSES:
INVENTOR
Peter Hleb,
BY Henry J Miller
ATTORNEY

UNITED STATES PATENT OFFICE.

PETER HLEB, OF ELIZABETH, NEW JERSEY, ASSIGNOR TO THE SINGER MANUFACTURING COMPANY, A CORPORATION OF NEW JERSEY.

NUT LOCK.

1,404,290.　　　Specification of Letters Patent.　　Patented Jan. 24, 1922.

Application filed May 31, 1919.  Serial No. 300,994.

*To all whom it may concern:*

Be it known that I, PETER HLEB, a citizen of the United States, residing at Elizabeth, in the county of Union and State of New Jersey, have invented certain new and useful Improvements in Nut Locks, of which the following is a specification, reference being had therein to the accompanying drawings.

This invention relates to nut and bolt-locks of a type especially suited for anchoring a hinge for flat-bed sewing machines to a supporting cabinet or table.

It aims to simplify and improve the construction of nut and bolt-locks by cheapening their cost of construction and bettering their mechanical efficiency and making them easy to assemble or apply.

The construction comprises essentially a U-shaped nut having diverging elastic sides which are adapted to be compressed upon the threads of a bolt which is threaded into the nut with its head bearing against the opposite side of a table or other member to which a part, such as a hinge, is to be secured or anchored.

The invention is illustrated in the accompanying drawings in which Fig. 1 represents a vertical cross-section of a preferred form of the invention. Fig. 2 represents the same in bottom plan view. Fig. 3 is a cross-section on the line 3, 3, Fig. 1. Fig. 4 is a bottom plan view of a portion of a table-top to which the invention has been applied as illustrated in Figs. 1 and 3 inclusive, and Fig. 5 represents in spaced perspective the washer and nut of the improved construction.

The invention is illustrated as applied to a wooden table or cabinet 1 which is recessed on its upper side or face to receive a disk 2 having a recess 3 which is crossed by a pintle 4 for the movable part 5 of a hinge to which latter the bed-plate of a sewing machine is adapted to be secured by a screw (not shown) extending into the necked portion 6, the table being also suitably cut away as indicated at 7 to permit free swinging movement of the movable part 5 of the hinge. The stationary part or disk 2 of the hinge is provided with a countersunk opening 8 for receiving the head 9 of a bolt 10 which is provided with the usual threads 11. The bolt 10 extends through a hole 12 in the table which is counterbored on its lower side as indicated at 13 and opens into a circular recess 14 in the bottom surface of the table 1, the recess being disposed eccentrically of the hole 12. Into the circular recess 14 in the table a washer 15 is placed with its polygonal and preferably square opening 15′ in line with the hole 12 in the table. The opening 15′ has at least two straight sides extending in the same direction whose faces are preferably at right angles to the bottom of the washer 14. The opening 15′ may be and is preferably punched out. The bolt 10 is adapted to be threaded into a U-shaped nut having a central or intermediate portion 16, which is apertured and threaded as indicated at 17, and having its opposite end portions 18 bent divergently away from the same side of its intermediate central portion, threads 17 preferably, but not necessarily, extending the full length of each bent end portion 18.

From a mere scrutiny of the drawings it will be obvious that the U-shaped nut may be drawn by the bolt 10 into the opening 15′ provided eccentrically in the washer 15 and its extremities or bent end portions 18 sprung inward thereby gripping the threads of the bolt. This is effected by a wedge or cam-like action of the sides of the opening 15′ upon the outer sides of the bent end portions 18. It is to be noted that the opening 15′ and the U-shaped nut are preferably so proportioned that the central or intermediate portion 16 of the nut reaches a position above the bottom of the washer 15, very much as illustrated in Fig. 3, before the nut effectively grips and holds the bolt or in other words before the nut and bolt are interlocked. It is also to be noted that the nut is preferably made from a bar or short strip of material of the same width and thickness throughout its length which may be readily bent to shape and drilled and tapped at a very low cost. The U-shaped nut grips the bolt very tightly and effectively prevents the same from becoming loose under vibration and jar such as usually accompany the operation of sewing machines. It will also be noticed that the eccentric disposition of the hole 15′ in the washer 15 serves to hold the nut against rotation while the bolt is being turned and thereby dispenses with the necessity for using a wrench to hold the nut while the bolt is being turned. While it is preferable to employ a washer 15 provided with an eccentric opening it will be obvious that in instances where the supporting body is made of metal instead of wood, that the washer 15 may be dispensed with and any suitable form of a non-circular recess may be provided in the anchoring member 1 to prevent rotation of the U-shaped nut while the bolt is being tightened or set home.

Having thus set forth the nature of the invention, what I claim herein is—

1. In an interlocking nut and bolt construction, a bolt, a U-shaped nut having a central portion provided with a threaded aperture to receive the bolt and also with inclined end-portions on opposite sides of the axis of the threaded aperture, in combination with a member having an opening with at least two spaced marginal walls arranged to cooperate with said end-portions beyond their junction with the central portion and to grip said end-portions upon a bolt threaded into the nut on the opposite side of said central portion from the body of the bolt.

2. An interlocking nut and bolt construction including a bolt, a U-shaped nut having a central portion provided with a threaded aperture to receive the bolt and having elastic end-portions on opposite sides of the axis of the threaded aperture and at an angle to the central portion, in combination with a washer having an opening with at least two marginal walls arranged to compress the elastic end-portions upon a bolt-end protruding through the central portion of the nut.

3. An interlocking nut and bolt construction including in combination, a bolt, a U-shaped nut having a central body portion provided with a threaded aperture wholly surrounded by metal and also having end-portions integral with said body and arranged at an angle at opposite sides of the threaded aperture, and a circular washer provided eccentrically with a polygonal opening having at least two sides for cooperatively pressing the end-portions of the nut toward each other after the central portion has been drawn at least part way through the polygonal opening in the washer.

4. A nut made from a bar of metal with its opposite ends bent divergently from the same side thereof and having an intermediate central portion provided with a threaded aperture, in combination with a member provided with a polygonal opening having at least two sides spaced apart a distance not less than the distance between the outside faces of the bent end-portions at the plane of that face of the central portion from which the end-portions are bent.

5. In an interlocking nut and bolt construction, in combination, a bolt, a U-shaped nut having a centrally apertured and threaded body-portion and also having bent end-portions integral therewith and extending divergently therefrom at equal and opposite angles to the longitudinal axis of the central portion, and a washer having a rectangular opening therein adapted to bear against the bent end-portions beyond their junction with the central portion and to grip the projecting end of the bolt on the opposite side of the body portion of the nut from the body of the bolt when the bolt is threaded into the nut.

6. A nut and bolt-lock comprising in combination, a headed bolt, a washer provided eccentrically with a hole having at least two parallel sides, and a nut adapted to be drawn into said opening and having a threaded body portion and elastic end portions connected to the body portion and shaped to react with the walls of the opening to grip the bolt tightly when the latter is turned in the direction drawing the nut into the hole provided in the washer.

7. A nut and bolt-lock comprising in combination, a bolt, a washer provided with a non-circular opening, and a U-shaped nut having a central apertured and threaded portion to receive the bolt and corresponding externally in cross-section to said non-circular opening in the washer, and means integral with the nut cooperating with the washer for gripping and holding the bolt wholly on the opposite side of the central portion of the nut from the body-portion of the bolt.

8. A nut and bolt-lock comprising a U-shaped nut having an intermediate apertured and threaded central portion and relatively diverging end portions bent therefrom and extending from the same side of said central portion at opposite extremities thereof, said central and end portions together constituting the U-shaped body of the nut, a washer provided with a polygonal opening having at least two sides which are respectively parallel to the bent end portions of the nut and which are spaced apart to receive the nut freely until its central intermediate portion is above the bottom surface of the washer.

In testimony whereof, I have signed my name to this specification.

PETER HLEB.